United States Patent [19]

Palmer

[11] Patent Number: 4,811,564

[45] Date of Patent: Mar. 14, 1989

[54] DOUBLE ACTION SPRING ACTUATOR

[76] Inventor: Mark D. Palmer, 45 Calvin St., Rochester, N.Y. 14612

[21] Appl. No.: 142,550

[22] Filed: Jan. 11, 1988

[51] Int. Cl.$^4$ .............................................. F03G 7/06
[52] U.S. Cl. ...................................................... 60/527
[58] Field of Search .......................... 60/527, 528, 529

[56] References Cited

U.S. PATENT DOCUMENTS

| | | |
|---|---|---|
| 954,682 | 4/1910 | Low et al. . |
| 2,967,249 | 1/1961 | Quirk ................................. 60/529 X |
| 3,016,691 | 1/1962 | Asakawa et al. . |
| 3,163,732 | 12/1964 | Abbott et al. . |
| 4,463,560 | 8/1984 | Greenleaf et al. . |

FOREIGN PATENT DOCUMENTS 2148444  3/1985  United Kingdom .................. 60/529

Primary Examiner—Allen M. Ostrager
Attorney, Agent, or Firm—Robert M. Phipps

[57] ABSTRACT

Electrically operated linear actuators are provided wherein both the forward and rearward motions are obtained by heating a shape memory metal to its austenitic state and thereafter cooling it to its martensitic state. One shape memory metal forms a retractor spring while the other shape memory metal forms an expansion spring.

8 Claims, 2 Drawing Sheets

DOUBLE ACTION SPRING ACTUATOR

BACKGROUND

1. Field of the Invention

This invention relates to activators where both the forward and reverse linear movement force is supplied by springs.

2. Description of the Prior Art

U.S. Pat. No. 954,682 patented Apr. 12, 1910 to A. A. Low et al discloses electrothermal means for producing mechanical movement. This movement is achieved by having two circuits in mechanical opposition attached at a common place on a pivotally mounted arm. Each circuit has a current carrying thermally expansible member held in position by a spring. Movement is obtained by passing electric current through one of the two circuits causing that wire to expand and the spring to contract. This action allows the heated member arm to swing towards the unheated arm.

U.S. Pat. No. 3,016,691 patented Jan. 16, 1962 by G. Asakawa et al discloses a device for converting electrical energy into translational mechanical movement. This movement is achieved by filling an insulated cylinder with a mixture of finely divided electrically conductive particles dispersed in a thermally expansible non conductor of electricity. An electrode in contact with the mixture is attached at the closed end of the cylinder and the other electrode is attached to an electrically conductive piston inserted into the open end of the cylinder. As the current flows through the mixture, the mixture expands, forcing the piston out.

U.S. Pat. No. 3,163,732 patented Nov. 19, 1974 to C. D. Hickling discloses an electric switch which is actuated (pushed to the closed position) by an arm which is pulled down across the switch. The arm is moved into position by the heating of a Nitinol TM or similar alloy wire which forms a spring. When the spring cools, the lever is moved back to the off position by a leaf expansion spring. The switch is used for thermostats and the like.

U.S. Pat. No. 4,463,560 patented Aug. 7, 1984 to A. H. Greenleaf et al discloses a thermal actuator apparatus for adjusting the position of a surface as a function of temperature. The adjustment is achieved by the use of springs having different thermoelastic coefficients between the two planes. Together they are in a balanced equilibrium condition but individually one is pulling in and the other is pushing out. One of the springs is made of an alloy while the other is made of stainless steel.

The need for a linear actuator has been recognized and many attempts have been made to provide a solution. However, each device offered has required one type of mechanism to extend the actuator and a different means for returning the actuator to the starting position. Furthermore, many of these devices required more space than desired due to their clumsy mechanisms. Thus it is an object of this invention to provide an actuator which employs the same type of means for movement in each direction. It is another object of this invention to provide a more compact actuator requiring less space for and during operation. Still other objects will be apparent to those skilled in the art upon reference to the following detailed description.

SUMMARY OF THE INVENTION

In accordance with this invention there is provided an improved linear double action actuator comprising a retractor spring and an expansion spring both of which are constructed from a shape memory metal. Each of the springs are attached at one end to the end of a movement arm formed within the actuator. The springs are attached at their other end to a stationary member formed within the actuator at a terminal providing for movement of the arm's path. There is also provided apparatus for connecting the actuator to a source of energy and selectively supplying the energy to only one of the springs at any time as desired. The energization of the spring transforms it from the martensitic state to the austenitic state resulting in movement of the arm in a desired direction within the actuator.

DESCRIPTION OF THE PREFERRED EMBODIMENTS

Figure 1:
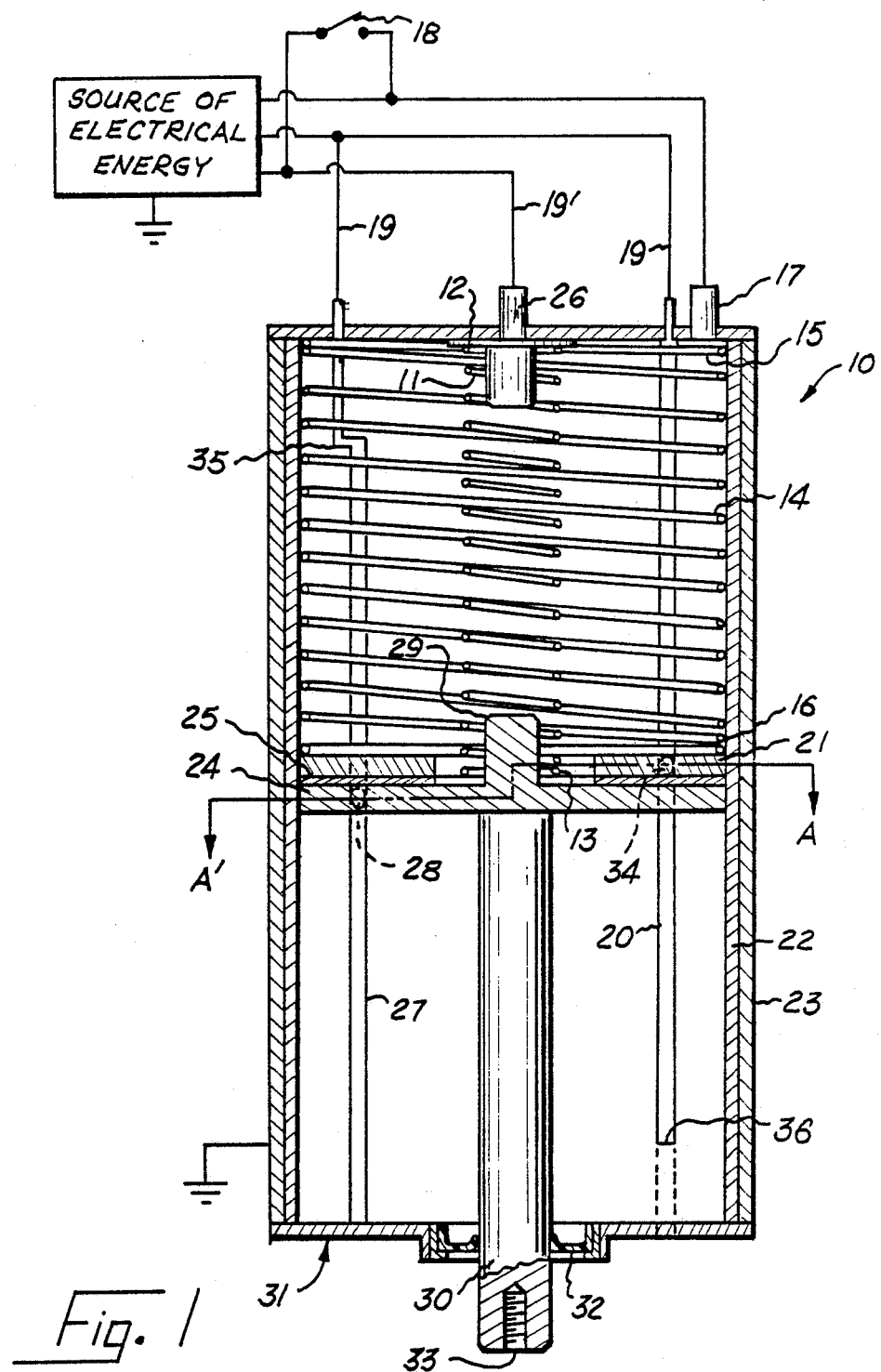
FIG. 1 is a sectional side view of a linear actuator according to the principles of this invention.
Figure 2:
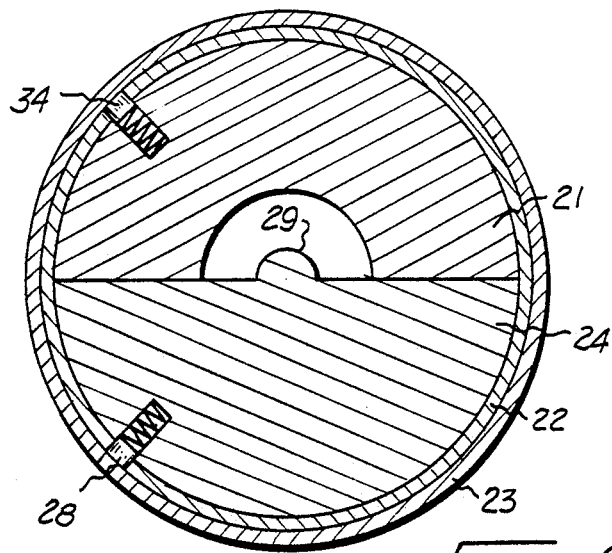
FIG. 2 is a cross sectional end view taken along line A—A' of FIG. 1.

With reference to FIGS. 1 and 2, an actuator 10 includes a retraction shape memory element 11 having a first end 12 and a second end 13. The retraction element 11 is capable of being longitudinally extended when in its martensitic state. The actuator 10 also includes an expansion shape memory element 14 having a first end 15 and a second end 16. Expansion element is capable of being longitudinally contracted when in its martensitic state. Memory elements 11, 14 are capable of dimensional and shape recovery when the alloy of the element is heated and goes from a martensitic state to an austenitic state.

The memory elements 11, 14 may be formed from a shape memory alloy such as those disclosed in U.S. Pat. Nos. 3,012,882, and 3,174,851 and Belgian Pat. No. 703,649, the disclosures of which are incorporated by reference herein. As made clear in these patents, these alloys undergo a reversible transformation between austenitic state and martensitic states at certain temperatures. When they are deformed while in the martensitic state, the alloys will retain this deformation while retained at that temperature, but will revert to their original configuration when they are heated to a higher temperature at which they transform to their austenitic state. This ability to recover upon warming has been utilized in U.S. Pat. Nos. 4,035,007 and 4,198,081, which are also incorporated by reference herein. The temperatures at which these transitions occur are affected by the nature of the alloy. The shape memory alloy from which the shape memory element 11, 14 may be fabricated is preferably titanium/nickel based alloy, such as those alloys available under the trademarks Nitinol or Tinel, although copper based alloys having similar properties may be used. Other shape memory metals are disclosed in U.S. Pat Nos. 3,783,037; 4,407,776; 4,144,104; and 4,472,213 which are also incorporated herein by reference.

The expansion memory element 14 is connected at its first end 15 to electrical connection 17 which, by the way of a switch 18, connects the actuator 10 to a source of energy. The energy source can be either electrical or thermal as desired. For the purpose the drawings the energy source is electrical. The second end 16 of expansion memory element 14 is connected via expansion end plate 21 to the electric circuit return wire 19 by use of strip contact 20. The expansion end plate 21 is equipped with a spring loaded contact 34 which maintains contact with strip contact 20. While in electrical contact with return strip 20 the second end 15 of expansion element 14 is mechanically secured to the expansion end plate 21 which fits within the internal dimensions of an insulated inner housing 22 which is received with the outer housing 23 of actuator 10. The outer housing 23 has sufficient strength, etc., to protect the insulated inner housing 22 and structural integrity of the actuator 10.

The expansion end plate 21 is secured, such as by bonding, to retractor end plate 24, yet is electrically separated therefrom by an insulator plate 25. Plates 21, 24 may be made of any metal having good electrical conducting properties and required structural strength. For many applications brass has been found to be a suitable metal.

The first end 12 of retraction memory element 11 is attached to the actuator 10 at a combination electrical connector and guide plug 26 which is maintained in place by a cap 23' formed at one end of the outer housing 23. The electrical connector and guide plug 26 is connected to the source of electricity by way of wire 19'. The second end 13 of memory element 11 is secured to a hub portion 29 of the retractor end plate 24. A spring loaded contact, 28 mounted to retractor end plate 24, is engaged to strip contact 27 which is connected via wire 19 to the source of energy.

Mounted on the retractor end plate 24 on the side opposite positioning hub 29 is a movement arm, or plunger 30, which is sufficiently long to extend through end wall 31 when the retraction shape memory element 11 is in the austenitic state. The end wall 31 is preferably provided with a seal 32, which can be made from materials well known in the art, e.g., felt or rubber, is provided in end wall 31 and is sized so as to seal about plunger 30. The exposed end of the plunger 30 is provided with a threaded well 33 for connecting to a rod, antenna or the like.

As an optional feature the actuator 10 may be equipped with trip electrical switches to open the circuit when the energized shape memory element 11 has moved the plunger 30 to its maximum position in the desired direction. FIG. 1 shows the placement of a simple circuit switch 35 on retractor return strip contact 27 and circuit switch 36 on expansion return strip contact 20.

FIG. 2 is a cross sectional end view of the actuator 10 in FIG. 1 taken at line A—A'. To better illustrate the invention line A—A' off sets at the center of the hub portion 29 of the retractor end plate 24, so that half of line A—A' proceeds through the retractor end plate 24 and the other half is offset parallel to the original line to pass through the expansion end plate 21. As shown in FIG. 2 spring loaded contact point 28 in retractor end plate 24 is for convenience located on the same side of the actuator 10 as is spring loaded contact point 34 in expansion end plate 21.

In many mechanical devices in order to control a desired function a single pole switch, cam or worm gear must be positioned in the device such that it is not practical for an operator to physically attend to the control. Additionally, the space provided for the control mechanism many times is not sufficient to permit location of that mechanism. These are but two instances where the actuator of this invention finds use. Additionally, the actuator simplifies the desire and construction of robotic machines for the assembly line, hazardous work areas and the like.

The actuator 10 functions by supplying electrical energy through the control switch 18 to the expansion memory shape element 14 which, when heated, transforms to its austenitic shape and resumes its expansion spring shape thereby moving the expansion end plate 21 and plunger 30 to their fully extended position. The application of electrical energy can then be discontinued either by operation of circuit switch 36 being reset by the passage of the expansion end plate 21 or manual resetting of switch 18. When it is desired to retract plunger 30, electrical energy is applied to retractor memory shape element 11 by the setting of switch 18. The transformation of retractor memory shape element 11 to the austenitic state moves retractor end plate 25 and plunger 30 to its innermost position within the actuator 10. As the retractor end plate passes circuit switch 35, or switch 18 is reset, the supply of electrical energy is interrupted and retractor memory shape element 11 returns to its martensitic form and the system is again at rest.

Figure 3:
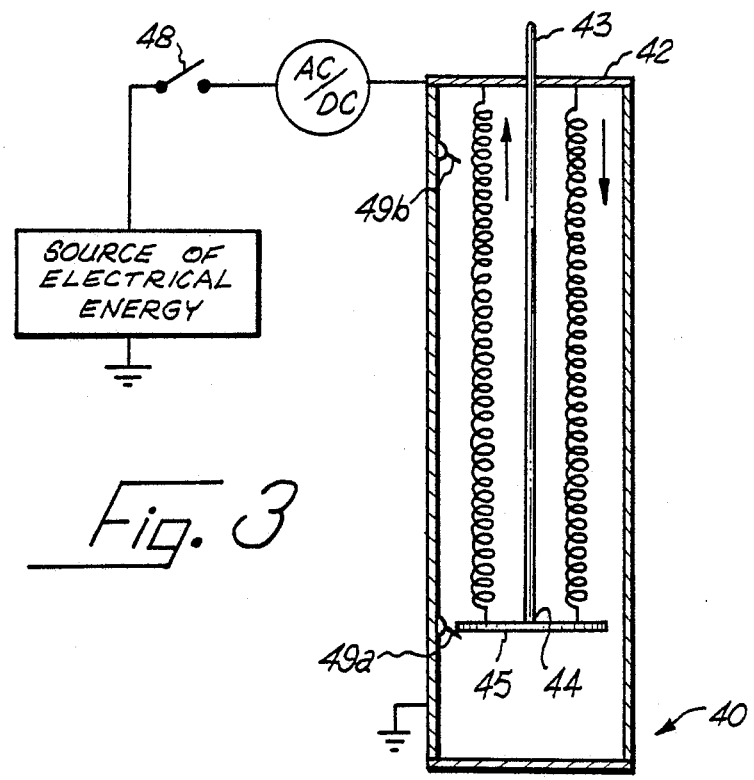
FIG. 3 is a schematic of a further embodiment of this invention.

A further embodiment of the actuator of this invention is schematically shown in FIG. 3. In this embodiment the actuator 40 comprises an outer housing 41 to which cover plate 42 is attached. A plunger or movement arm 43 extends through the cover plate 42. One end 44 of the plunger 43 is attached a plate 45. The opposite end of the plunger 43, which extends through cover plate 42, is attached to retractor shape memory element 46 which will form a retractor spring when in the austenitic state. An expansion shape memory element 47, which will form an expansion spring when in the austenitic state, is secured to plunger 43 opposite memory element 46. The actuator is supplied with electrical energy (from a desired source) which flows through a switch 48 to the desired shape memory element by way of suitable electrical conduits (not shown). When the plunger 43 and plunger or movement arm plate 44 have been moved sufficiently in the desired direction a simple mechanical lock 49 is tripped and the plunger 43 and plate 44 are then held in place without the further application of electrical energy. When the plunger 43 is to be moved in the opposite direction, the energized shape memory element has sufficient strength to over ride the lock and release the arm 43. Actuator 40 is suitable for the raising and lowering of, for instance, automotive radio antenna and the like.

In each instance the source of electrical energy can be a direct current or alternating current source as desired.

The foregoing examples and methods have been described in the foregoing specification for the purpose of illustration and not limitation. Many modifications and ramifications will naturally suggest themselves to those skilled in the art based on this disclosure. These are intended to be comprehended as within the scope of this invention.

The embodiments of the invention in which as exclusive property or privilege is claimed are defined as follows:

1. In a linear double action actuator the improvement which comprises:
   a retractor spring constructed of a shape memory metal and an expansion spring constructed of a shape memory metal, each of said springs being attached at one end thereof to one end of an arm movably supported by and within said actuator, each of said springs being attached at their other end to a stationary member formed within said actuator, means for connecting said actuator to a source of energy and means for supplying said energy selectively to one of said springs, whereby the selective amortizations transforms said energized spring from the martensitic state to the austenitic state thereby slidably moving said movable arm in the desired direction within said actuator, said springs being substantially parallel at all times to each other and to the path of travel of said movable arm.

2. The actuator of claim 1 wherein said retractor spring and said expansion spring are mounted separately from the other.

3. The actuator of claim 1 wherein said source of energy is an electrical source.

4. The actuator of claim 1 wherein said source of energy is a thermal source.

5. The actuator of claim 1 wherein said actuator includes means for sealing said movable arm to said actuator.

6. The actuator of claim 1 wherein said actuator further includes means for limiting the travel in either direction of said movable arm.

7. The actuator of claim 6 wherein said movable arm includes means formed thereon for attachment of an antenna.

8. In a linear double action actuator the improvement which comprises:
a retractor spring constructed of a shape memory metal and an expansion spring constructed of a shape memory metal, each of said springs being attached at one end thereof to one end of an arm movably supported by and within said actuator, each of said springs being attached at their other end to a stationary member formed within said actuator, means for connecting said actuator to a source of energy and means for supplying said energy selectively to one of said springs, whereby the selective amortizations transforms said energized spring from the martensitic state to the austenitic state thereby moving said movable arm in the desired direction within said actuator, said retractor spring is contained within said expansion spring.

* * * * *

UNITED STATES PATENT AND TRADEMARK OFFICE
CERTIFICATE OF CORRECTION

PATENT NO.  : 4,811,564
DATED       : March 14, 1989
INVENTOR(S) : Mark D. Palmer It is certified that error appears in the above-identified patent and that said Letters Patent is hereby corrected as shown below:

Claim 1 at column 5, line 7 and
Claim 8 at column 6, line 19
    delete " amortization ", and
    insert --- energization ---.

Signed and Sealed this

Thirty-first Day of October, 1989

Attest:

DONALD J. QUIGG

*Attesting Officer*  *Commissioner of Patents and Trademarks*